US012783065B2

(12) United States Patent
Kaneda et al.

(10) Patent No.: US 12,783,065 B2
(45) Date of Patent: Nov. 3, 2026

(54) ELECTRONIC PEN CORE BODY AND ELECTRONIC PEN

(71) Applicant: Wacom Co., Ltd., Saitama (JP)

(72) Inventors: Takenori Kaneda, Saitama (JP); Kohei Tanaka, Saitama (JP); Hock Meng Wan, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 19/185,678

(22) Filed: Apr. 22, 2025

(65) Prior Publication Data

US 2025/0251803 A1 Aug. 7, 2025

Related U.S. Application Data

(63) Continuation of application No. PCT/JP2023/029483, filed on Aug. 15, 2023.

(60) Provisional application No. 63/478,032, filed on Dec. 30, 2022, provisional application No. 63/386,587, filed on Dec. 8, 2022.

(51) Int. Cl.
*G06F 3/0354* (2013.01)

(52) U.S. Cl.
CPC ................................ *G06F 3/03545* (2013.01)

(58) Field of Classification Search
CPC ................................................... G06F 3/03545
See application file for complete search history.

(56) References Cited

U.S. PATENT DOCUMENTS

| | | | | |
|---|---|---|---|---|
| 2011/0162894 | A1 * | 7/2011 | Weber | G06F 3/03545 178/19.03 |
| 2019/0171303 | A1 * | 6/2019 | Kaneda | G06F 3/03545 |
| 2020/0026368 | A1 * | 1/2020 | Steinmark | G06F 3/03545 |
| 2024/0370164 | A1 * | 11/2024 | Zhong | G06F 40/171 |

FOREIGN PATENT DOCUMENTS

| | | | |
|---|---|---|---|
| JP | H0744373 | U | 11/1995 |
| JP | 2013161307 | A | 8/2013 |
| JP | 2014021674 | A | 2/2014 |
| JP | 2015026359 | A | 2/2015 |
| JP | 2016126503 | A | 7/2016 |

OTHER PUBLICATIONS

International Search Report, mailed Oct. 3, 2023, for International Application No. PCT/JP2023/029483. (4 pages) (With English Translation).

* cited by examiner

*Primary Examiner* — Hang Lin
(74) *Attorney, Agent, or Firm* — Seed Intellectual Property Law Group LLP

(57) ABSTRACT

An electronic pen core body includes a front end portion configured to project outward from an opening on one end side in an axial direction of a tubular casing of an electronic pen. A plurality of projections and depressions are provided along a circumferential direction of the electronic pen core body and/or along an axial direction of the electronic pen core body, in at least a part of the front end portion. The part of the front end portion is configured to come into contact with an input surface when the electronic pen performs an indication input on the input surface by the electronic pen.

22 Claims, 9 Drawing Sheets

ELECTRONIC PEN CORE BODY AND ELECTRONIC PEN

BACKGROUND

Technical Field

The present disclosure relates to an electronic pen core body and an electronic pen.

Description of the Related Art

An electronic pen is used for position indication input in a detection region of a position detecting sensor by a user causing, as a pen tip, the front end side of an electronic pen core body (hereinafter abbreviated as a core body) projecting from an opening on the pen tip side of a casing of the electronic pen to come into contact with an input surface corresponding to the detection region of the position detecting sensor, or moving the front end side while the front end side is in contact with the input surface. The position detecting sensor detects a movement trajectory of the pen tip of the electronic pen as a writing trajectory of the electronic pen.

Friction between the input surface and the pen tip is an important factor for the sense of ease in using the electronic pen on the input surface. A surface characteristic of the input surface and a surface characteristic of the pen tip on the front end side of the core body of the electronic pen that comes into contact with the input surface greatly affect the sense of ease.

Since the pen tip on the front end side of the core body for the electronic pen is slid on the input surface, the core body for the electronic pen is typically formed of a material having a front end portion which is hard and tear/shave resistant and is easily slidable (self-lubricating) in many cases. Polyoxymethylene (POM), which is an example of a hard resin material, is known as a typical material of the core body of this type. POM is a substance that is easily slidable and is tear/shave resistant, and is known as a material that is excellent in wear resistance.

Recently, with the widespread use of the electronic pen, a similar sense of ease in using a pencil to write on paper is expected of the electronic pen used to write on the input surface. However, in a case where the material of the core body is a hard resin material such as POM, when the core body is brought into contact with a glass surface or a resin surface as the input surface, the core body slides too much, and thus cannot reproduce the similar sense of ease in using a pencil to write on paper.

Accordingly, to improve usability of an electronic pen, a core body has been proposed in which a soft material such as an elastomer or a felt is attached to a front end of a hard plastic material such as POM. Japanese Patent Laid-open No. 2014-21674, for example, discloses a core body having a felt attached to a front end portion of hard resin such as POM. In addition, Japanese Patent Laid-open No. 2015-26359 discloses a core body having a soft and elastic member such as an elastomer bonded and attached to a front end portion of hard resin such as polycarbonate, for example, by two-color molding.

BRIEF SUMMARY

However, in a case of using a core body having a soft material member such as an elastomer or a felt attached to a front end of a hard plastic material such as POM as described above, the sense of ease in using the core body is improved based on an adequate amount of friction generated, but a problem arises in that the soft member such as an elastomer tends to be easily worn and is difficult to form into a thin (fine) pen tip shape.

In recent years, in addition to the sense of ease, improvement in visibility of the pen tip is desired. For example, in a case where the position detecting sensor is so provided as to be superimposed on a display surface of a display device such as a liquid crystal display, the display surface (glass surface or the like) is the input surface of the electronic pen. A display of a writing trace or a drawing trace which results from an indication input by the electronic pen is superimposed on a display image of the display surface.

The visibility of the pen tip of the electronic pen is important in a case where the display position of the indication input by the pen tip of the electronic pen on the input surface as the display surface of the display device is to coincide with a position on the display surface intended by the user. The thinner (finer) the pen tip of the electronic pen, the better the visibility, because a contact point position of the pen tip of the electronic pen on the input surface as visually recognized by the user coincides with the display result of the indication input by the pen tip (input result).

However, in the case of using the above-described conventional core body having a member of a soft material such as an elastomer or a felt attached to the front end of POM as a hard plastic material or the like, the soft member such as an elastomer is deformed to be crushed by a pen pressure, and a pen tip part in contact with the input surface is enlarged, to thereby degrade the visibility of the pen tip at a time of writing.

In view of the above problems, according to one aspect, an electronic pen core body is provided which can improve the sense of ease in using the core body by generating an adequate amount of friction while also improving wear resistance and pen tip visibility.

An electronic pen core body includes a front end portion configured to project outward from an opening on one end side in an axial direction of a tubular casing of an electronic pen. A plurality of projections and depressions are formed along a circumferential direction about an axis of the core body and/or along an axial direction of the core body, in at least a part of the front end portion configured to come into contact with an input surface when an indication input is performed on the input surface by the electronic pen.

The electronic pen core body having the configuration described above has the plurality of projections and depressions formed in at least the part of the front end portion which comes into contact with the input surface when an indication input is performed on the input surface by the electronic pen. Thus, a sense of ease in using the electronic pen is improved based on an adequate amount of friction generated between the part of the projections and depressions and the input surface. Moreover, with provision of the plurality of projections and depressions formed in the front end portion of the core body, it is possible to form the front end portion with a hard material so as to form the pen tip into a thin (fine) shape having improved pen tip visibility.

DETAILED DESCRIPTION

Embodiments of an electronic pen core body together with embodiments of an electronic pen using the electronic pen core body will hereinafter be described with reference to the drawings.

First Embodiment

Figure 1:
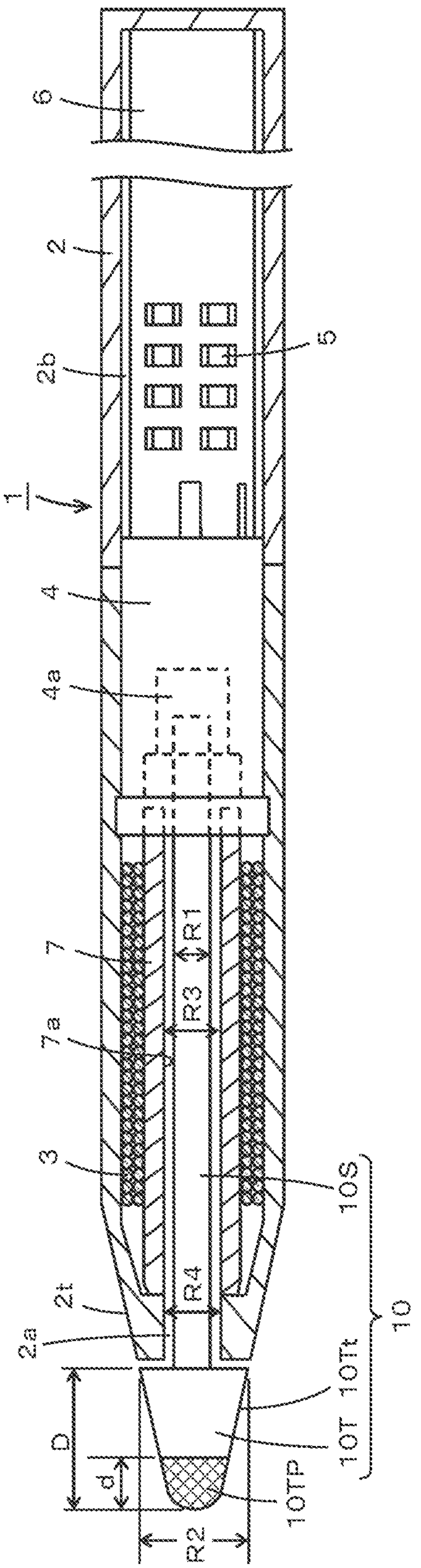
FIG. 1 is a diagram illustrating an overall configuration of an electronic pen and an electronic pen core body according to a first embodiment of the present disclosure.

A first embodiment is an example of a case where an electronic pen core body is applied to an electromagnetic induction type electronic pen. FIG. 1 is a diagram illustrating an example configuration of an electronic pen 1 according to the present first embodiment. As illustrated in FIG. 1, the electronic pen 1 has a casing 2 in a tubular shape or a circular cylindrical shape in the present example. For ease of description, the casing 2 and a coil 3 and a ferrite core 7, to be described later, are illustrated in cross-section in FIG. 1.

In the electronic pen 1 according to the present embodiment, one end side in the axial direction of the casing 2 is a pen tip side having a tapered shape portion 2*t* that is gradually tapered, and an opening portion 2*a* is provided to a front end side of the tapered shape portion 2*t* on the pen tip side. Another end side (a rear end side) in an axial direction of the casing 2 of the electronic pen 1, which is an opposite side from the pen tip side, is closed.

An internal hollow portion 2*b* of the casing 2 of the electronic pen 1 is configured to communicate with the opening portion 2*a* on the pen tip side, and houses inside a coil 3 for position detection, a pen pressure detecting portion 4, and a circuit board 6 in this order from the pen tip side in the axial direction of the casing 2. The circuit board includes electronic parts such as a capacitor 5 which constitutes a resonance circuit together with the coil 3.

The coil 3 is wound around a ferrite core 7 as an example of a magnetic core. The ferrite core 7 around which the coil 3 is wound is housed in the vicinity of the opening portion 2*a* on the pen tip side of the casing 2. The ferrite core 7 includes a through hole 7*a* in the axial direction. A center line position of the through hole 7*a* of the ferrite core 7 is configured to coincide with a center line position of the opening portion 2*a* of the casing 2.

As illustrated in FIG. 1, a core body 10 includes a front end portion 10T projecting outward of the opening portion 2*a* of the casing 2 and a core body main body portion 10S coupled to the front end portion 10T in the axial direction of the core body 10. The front end portion 10T and the core body main body portion 10S are formed as an integral object in the present embodiment, and are formed of hard resin, for example, POM, in the present example.

In the present example, the core body main body portion 10S of the core body 10 is formed as a rod-shaped body having a uniform diameter R1, and is configured such that a length thereof in the axial direction is greater than a length in the axial direction of the ferrite core 7. The front end portion 10T in the present example is formed in a conical shape having a tapered shape portion 10Tt that is gradually tapered, and a part of the front end portion 10T on a foremost end side thereof which comes into contact with an input surface (pen tip part) is formed in a domed curved surface shape. At least a maximum diameter R2 (diameter of a bottom surface portion of the conical shape) of the front end portion 10T is configured to be larger than the diameter R1 of the core body main body portion 10S.

In the present embodiment, a region 10TP (a cross-hatched region in FIG. 1) including a front end contact part in the front end portion 10T of the core body 10, which comes into contact with the input surface of a position detecting sensor, is provided with projections and depressions. In the following, the region 10TP including the front end contact part provided with the projections and depressions will be referred to as a projection-and-depression region 10TP. The configuration (shape) of the projections and depressions provided to the projection-and-depression region 10TP will be described later in detail.

In the front end portion 10T, the range of an area of the front end contact part that comes into contact with the input surface of the position detecting sensor is so set as to include not only a partial region that comes into contact with the input surface when the electronic pen 1 is erected perpendicularly to the input surface but also a partial region that comes into contact with the input surface when the electronic pen 1 is inclined (tilted) with respect to the input surface. When the length in the axial direction of the front end portion 10T of the core body 10 is set as D, on the peripheral side surface of the front end portion 10T (including the part in the domed curved surface shape on the foremost end side), the projection-and-depression region 10TP including the front end contact part of the front end portion 10T is the region of a part having a length d (<D) that is smaller than the length D from the foremost end (pen tip) of the front end portion 10T.

In the present embodiment, the projection-and-depression region 10TP is provided in the region having the length d in the axial direction including the front end contact part on the peripheral side surface of the front end portion 10T. However, the projection-and-depression region 10TP may be provided over the entire peripheral side surface having the length D in the axial direction of the front end portion 10T.

Diameter R3 of the through hole 7*a* of the ferrite core 7 is configured to be larger than the diameter R1 of the core body main body portion 10S of the core body 10, so that the core body main body portion 10S of the core body 10 can be inserted through the through hole 7*a* of the ferrite core 7.

Diameter R4 of an opening of the opening portion 2*a* of the casing 2 is set to be equal to or slightly larger than the diameter R3 of the through hole 7*a* of the ferrite core 7, but is set to be smaller than the maximum diameter R2 of the front end portion 10T of the core body 10. That is, R2>R4≥R3.

The pen pressure detecting portion 4 provided to the rear end side of the ferrite core 7 in the internal hollow portion 2*b* of the casing 2 includes a fitting portion 4*a*, to which an end portion on the rear end side of the core body main body portion 10S of the core body 10 is fitted. The fitting portion 4*a* of the pen pressure detecting portion 4 is configured to coincide with an extension of the through hole 7*a* of the ferrite core 7.

In the present example, the pen pressure detecting portion 4 has a configuration of a variable capacitance capacitor that detects a pressure applied to a front end of the core body 10 (pen pressure) as a change in capacitance. A s the pen pressure detecting portion of this type, well-known configurations can be used, such as a configuration in which a capacitance changes when an area of contact between a dielectric and a conductive elastic member changes according to the applied pressure (see Patent Document: Japanese Patent Laid-open No. 2016-126503, for example) and a configuration including a semiconductor device in which a distance between two electrodes opposed to each other with an air layer as a dielectric interposed therebetween changes according to the applied pressure (see Patent Document: Japanese Patent Laid-open No. 2013-161307, for example). Detailed description of the pen pressure detecting configurations is omitted.

The electronic pen 1 according to the present embodiment is configured such that the core body 10 according to the embodiment having the configuration as described below is inserted into the casing 2 through the opening portion 2*a*, extends through the through hole 7*a* of the ferrite core 7, and is fitted to and held by the fitting portion 4*a* provided in the pen pressure detecting portion 4. When the end portion on the rear end side of the core body main body portion 10S of the core body 10 is fitted to the fitting portion 4*a* of the pen pressure detecting portion 4, and is thereby mounted in the electronic pen 1, the front end portion 10T of the core body 10 is set in a state of projecting outward from an opening end on the pen tip side of the opening portion 2*a* of the casing 2, as illustrated in FIG. 1, and a slight gap is formed between the opening end on the pen tip side of the opening portion 2*a* of the casing 2 and the front end portion 10T of the core body 10 such that the core body 10 is movable in the axial direction.

Embodiment of Core Body

Various projection-and-depression shapes are possible in the projection-and-depression region 10TP of the front end portion 10T of the core body 10. In the following, description will be made of several examples of the projection-and-depression shapes in the projection-and-depression region 10TP.

First Example

Figure 2A:
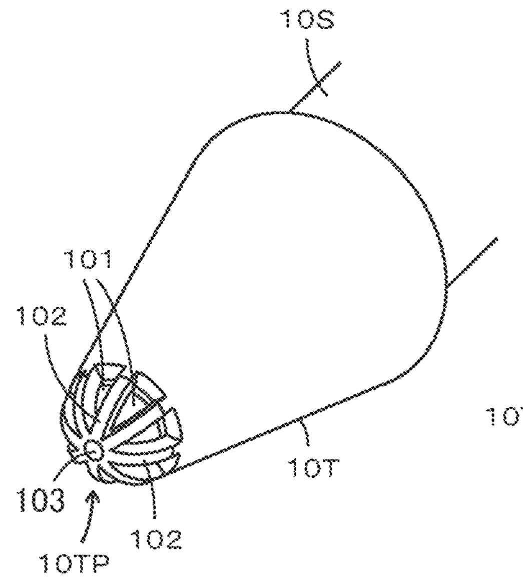
FIGS. 2A and 2B are diagrams illustrating a first example of a projection-and-depression shape provided to a front end portion of the electronic pen core body according to the first embodiment of the present disclosure.
Figure 2B:
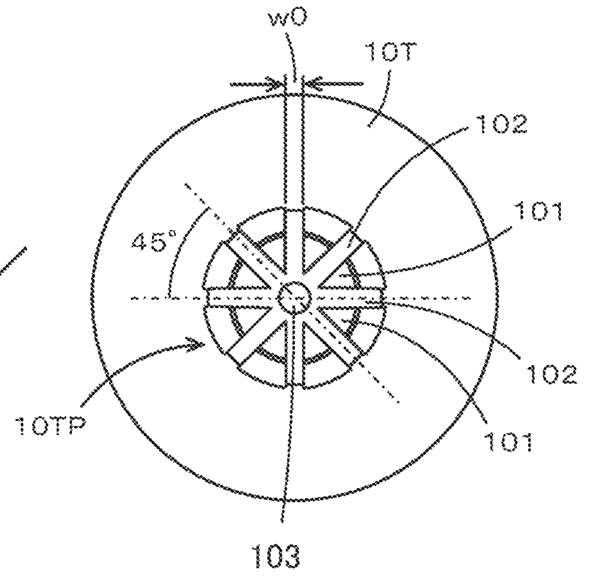

FIGS. 2A and 2B are diagrams illustrating an example of a projection-and-depression shape in a first example in the projection-and-depression region 10TP of the front end portion 10T of the core body 10. FIG. 2A is a perspective view of the front end portion 10T of the core body 10 as viewed obliquely from the foremost end side of the front end portion 10T. FIG. 2B is a view of the front end portion 10T of the core body 10 as viewed in the axial direction of the core body 10 from the foremost end side of the front end portion 10T.

In the example of FIGS. 2A and 2B, the projection-and-depression region 10TP of the front end portion 10T includes a plurality of grooves 101 defined on the peripheral side surface of the projection-and-depression region 10TP. The plurality of grooves 101 extend along the axial direction of the core body 10 and are arranged along a circumferential direction about a central axis of the core body 10, to thereby form a plurality of projections and depressions. Each of the plurality of grooves 101 constitutes a recessed portion. A partition wall 102 formed between adjacent grooves 101 of the plurality of grooves 101 constitutes a protruding portion.

As illustrated in FIGS. 2A and 2B, in the peripheral side surface of the projection-and-depression region 10TP of the front end portion 10T, each of the plurality of grooves 101 is formed in the shape of an isosceles triangle that is gradually widened in groove width toward the rear end side in the axial direction of the core body 10, with a top portion side of the foremost end of the front end portion 10T as a vertex of the isosceles triangle. In this case, as illustrated in FIG. 2B, the vertex position of the shape of the isosceles triangle of each of the plurality of grooves 101 is a position separated from a top portion of the foremost end of the front end portion 10T. A recessed hole 103 is formed in the top portion. In the present example, the diameter of the recessed hole 103 is set to be 0.2 mm, for example.

In the example of FIGS. 2A and 2B, eight grooves 101 having the same shape and the same size are formed along the circumferential direction about the central axis of the core body 10, and as illustrated in FIG. 2B, the vertical angle of the isosceles triangle of each of the plurality of grooves 101 is set to be 45 degrees in the present example. In the present example, the depth of each of the grooves 101 in the shape of an isosceles triangle from the peripheral side surface of the front end portion 10T (depth in a direction orthogonal to the peripheral side surface) is set to be equal to or more than 0.15 mm, for example. The depth of the grooves 101 from the peripheral side surface (toward the axial center) is so determined as to produce a sense of friction between the projections and depressions of the projection-and-depression region 10TP and the input surface.

A thickness (width) w0 of each of the eight partition walls 102 between two adjacent grooves 101 of the plurality of grooves 101 is set to have a fixed value, for example, w0=0.15 mm. Further, each of the partition walls 102 has two parallel surfaces substantially orthogonal to the peripheral side surface of the front end portion 10T, and is configured such that an upper end surface of each partition wall having the width w0 is continuous (flush) with the peripheral side surface of the front end portion 10T to form a smooth surface.

The projection-and-depression shape of the projection-and-depression region 10TP in the front end portion 10T of the core body 10 having the configuration as described above can be obtained by forming a corresponding projection-and-depression shape in a mold for producing the core body 10, specifically, by laser engraving the corresponding projection-and-depression shape in a part of the mold which forms the front end portion 10T of the core body 10.

Figure 3A:
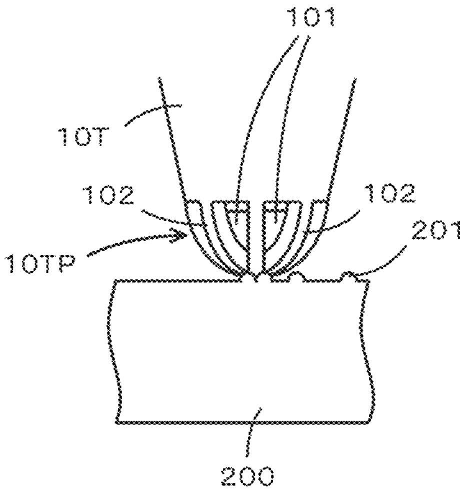
FIGS. 3A and 3B are diagrams illustrating functional effects of the first example of the projection-and-depression shape provided to the front end portion of the electronic pen core body according to the first embodiment of the present disclosure.
Figure 3B:
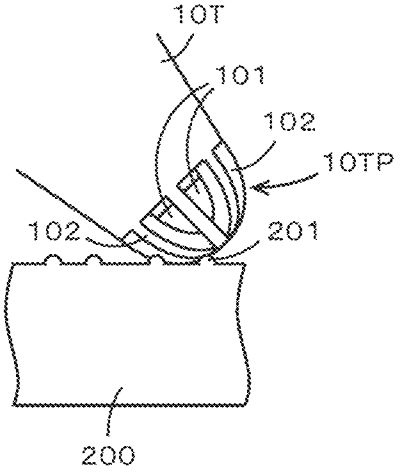

Since the core body 10 in the first embodiment has the projection-and-depression region 10TP provided with the projections and depressions of the configuration as described above in the front end portion 10T, it is possible to produce a sense of friction and a sense of vibration even on a smooth surface such as a glass surface. Specifically, at a time of writing with the electronic pen 1, as illustrated in FIGS. 3A and 3B, the projections and depressions of the projection-and-depression region 10TP in the front end portion 10T of the core body 10 according to the first embodiment interact with minute projections and depressions 201 provided of an input surface 200 formed of antiglare glass (A G glass). This improves the sense of vibration and the sense of friction between the minute projections and depressions 201 of the input surface 200 and the projections and depressions of the projection-and-depression region 10TP in the front end portion 10T of the core body 10. According to the core body 10 in the first embodiment, it is possible to improve the sense of friction even when the input surface 200 is non-antiglare glass (non-A G glass).

In this case, since the front end portion 10T of the core body 10 is formed of hard resin such as POM, it is easy to form the front end side of the front end portion 10T of the core body 10 which comes into contact with the input surface into a thin (fine) shape. Moreover, since the projection-and-depression region 10TP is provided to the thinly-shaped front end side of the hard front end portion 10T, the thinly-shaped front end side is readily visible at an indicated position on the input surface. Further, since the front end portion 10T of the core body 10, including the projection-and-depression region 10TP, is formed of hard resin, it has superior wear resistance unlike in the case of using elastomer or the like.

Figure 4:
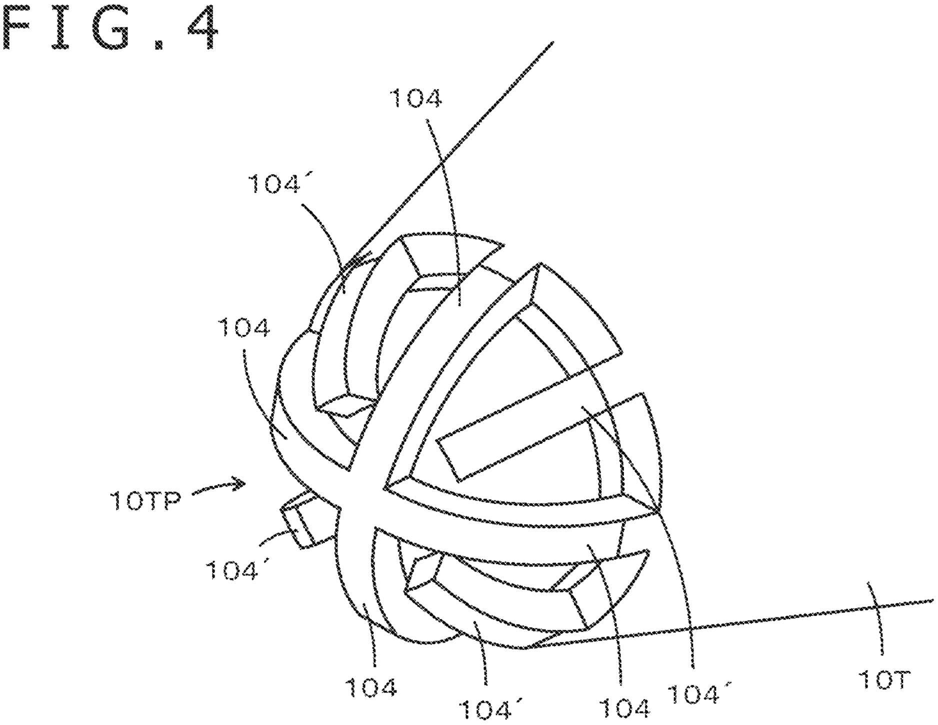
FIG. 4 is a diagram illustrating a modification of the first example of the projection-and-depression shape provided to the front end portion of the electronic pen core body according to the first embodiment of the present disclosure.

In the example of FIGS. 2A and 2B, all of the partition walls 102 between adjacent ones of the plurality of grooves 101 are formed to meet with each other on the foremost end side of the projection-and-depression region 10TP and are continuous with the peripheral side surface of the front end portion 10T. However, as illustrated in FIG. 4, it is possible to configure some of the partition walls, for example, every other partition wall 104' among a plurality of partition walls 104, in the circumferential direction of the plurality of partition walls 104, to be discontinued (truncated) on the foremost end side of the projection-and-depression region 10TP. In this case, grooves 101 adjacent to each other that sandwich a discontinued partition wall 104' are continuous with each other on the foremost end side of the projection-and-depression region 10TP.

In the case of the example of FIG. 4, even when a writing input is performed with the electronic pen 1 in a state in which the axial direction of the core body 10 is substantially orthogonal to the input surface, the projections and depressions formed in the projection-and-depression region 10TP of the front end portion 10T of the core body 10 produce a sense of vibration and a sense of friction.

Second Example

In the first example described above, the projections and depressions of the projection-and-depression region 10TP in the front end portion 10T of the core body 10 are formed by the eight grooves 101 having the same shape and size of an isosceles triangle arranged along the circumferential direction about the central axis of the core body 10. In a second example, each of the grooves 101 in the shape of an isosceles triangle is divided into a plurality of groove in an axial direction on the peripheral side surface of the front end portion 10T.

Figure 5A:
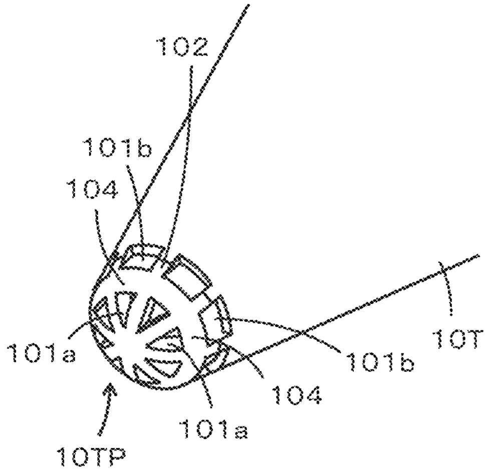
FIGS. 5A and 5B are diagrams illustrating a second example of a projection-and-depression shape provided to the front end portion of the electronic pen core body according to the first embodiment of the present disclosure.
Figure 5B:
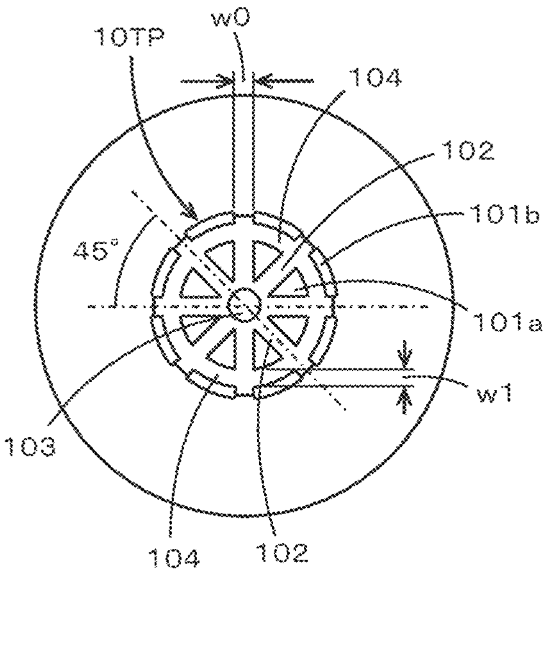

FIGS. 5A and 5B are diagrams illustrating an example of a projection-and-depression shape in the second example in the projection-and-depression region 10TP of the front end portion 10T of the core body 10. FIG. 5A is a perspective view of the front end portion 10T of the core body 10 as viewed obliquely from the foremost end side of the front end portion 10T. FIG. 5B is a view of the front end portion 10T of the core body 10 as viewed in the axial direction of the core body 10 from the foremost end side of the front end portion 10T.

In the example of FIGS. 5A and 5B, the grooves in the shape of an isosceles triangle are divided into two in the present example along the axial direction of the peripheral side surface of the front end portion 10T, and have a shape collectively formed by a groove 101*a* and a groove 101*b*. In the example of FIGS. 5A and 5B, the eight grooves in the shape of an isosceles triangle are divided at the same position in the axial direction of the peripheral side surface of the front end portion 10T. Hence, in the example of FIGS. 5A and 5B, partition walls 104 which form part of the peripheral side surface of the front end portion 10T are provided between the grooves 101*a* and the grooves 101*b* formed along the axial direction of the peripheral side surface of the front end portion 10T. A s illustrated in FIG. 5B, eight partition walls 104 are connected to each other in the circumferential direction to form a ring-shaped portion.

Width w1 of the ring-shaped portion constituted by the eight partition walls 104 in the present example is set to be the same as width w0 of the partition wall 102, and is set to be w1=0.15 mm in the present example.

The projection-and-depression region 10TP having the projection-and-depression shape in the second example can also provide effects similar to those of the core body 10 in the first example.

Third Example

Figure 6:
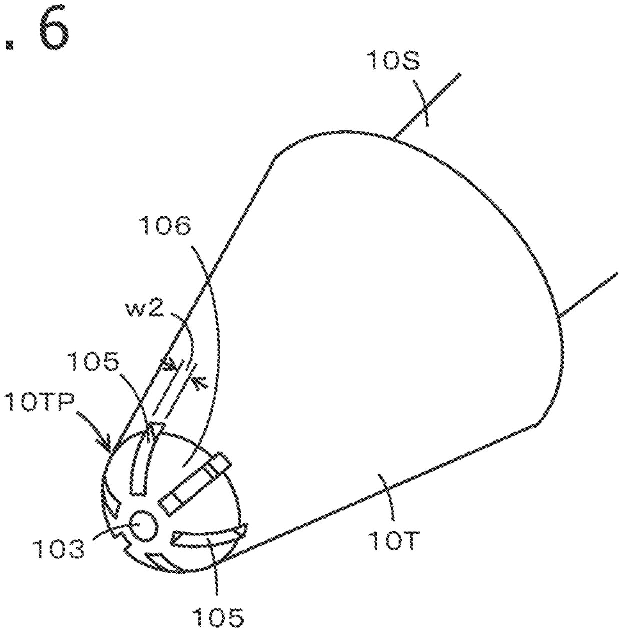
FIG. 6 is a diagram illustrating a third example of a projection-and-depression shape provided to the front end portion of the electronic pen core body according to the first embodiment of the present disclosure.

FIG. 6 is a diagram illustrating an example of a projection-and-depression shape in a third example applied in the projection-and-depression region 10TP of the front end portion 10T of the core body 10. FIG. 6 is a perspective view of the front end portion 10T of the core body 10 as viewed obliquely from the foremost end side of the front end portion 10T.

The third example illustrated in FIG. 6 is different from the first example in the shape of grooves provided to the projection-and-depression region 10TP of the front end portion 10T. In the third example illustrated in FIG. 6, in place of the grooves 101 in the shape of an isosceles triangle in the first example, a plurality of grooves 105, or eight grooves 105 in the present example, are formed such that a width w2 thereof in the circumferential direction of the peripheral side surface of the front end portion 10T is set to have a predetermined fixed value. Hence, in the case of the third example, a partition wall 106 between two grooves 105 adjacent to each other in the circumferential direction is in the shape of an isosceles triangle.

In the case of the third example, unlike in the first example and the second example, the depth of the grooves 105 is configured to be increased toward the rear end side along the axial direction from the front end of the front end portion 10T of the core body 10. In this case, in the present example, a bottom (floor) surface of each of the grooves 105 as viewed in a direction orthogonal to the axial direction from the peripheral side surface of the front end portion 10T of the core body 10 is configured to be parallel with the axial direction of the core body 10.

The projection-and-depression region 10TP having the projection-and-depression shape in the present third example can also provide effects similar to those of the core body 10 in the first example.

Fourth Example

Figure 7:
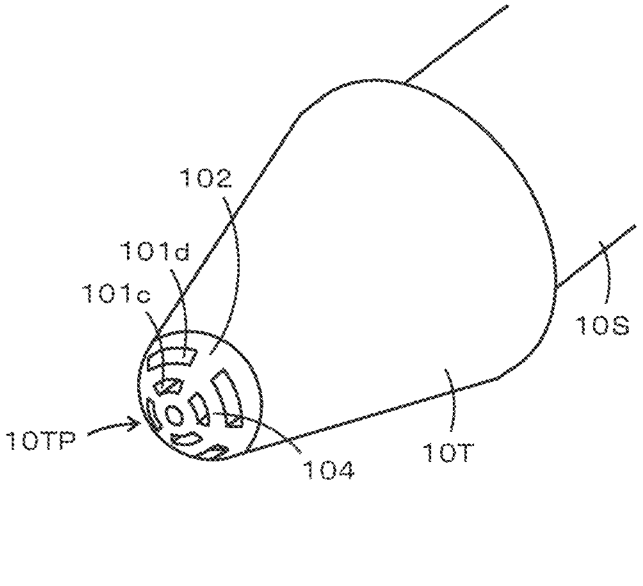
FIG. 7 is a diagram illustrating a fourth example of a projection-and-depression shape provided to the front end portion of the electronic pen core body according to the first embodiment of the present disclosure.

FIG. 7 is a diagram illustrating an example of a projection-and-depression shape in a fourth example applied in the projection-and-depression region 10TP of the front end portion 10T of the core body 10. FIG. 7 is a perspective view of the front end portion 10T of the core body 10 as viewed obliquely from the foremost end side of the front end portion 10T.

The present fourth example is a modification of the second example. In the projection-and-depression region 10TP in the second example, as in the first example, the grooves 101*a* and the grooves 101*b* provided along the axial direction of the peripheral side surface of the front end portion 10T are set to have a fixed depth as viewed from the peripheral side surface of the front end portion 10T of the core body 10. In contrast, in the projection-and-depression region 10TP in the fourth example, as in the third example, the grooves 101*c* and 101*d* arranged along the axial direction of the peripheral side surface of the front end portion 10T are configured such that their depths increase toward the rear end side along the axial direction from the front end of the front end portion 10T of the core body 10.

In this case, in the present example, a bottom (floor) surface in each of the groove 101*c* and the groove 101*d* as viewed in a direction orthogonal to the axial direction from the peripheral side surface of the front end portion 10T of the core body 10 is configured to be parallel with the axial direction of the core body 10. In the case of the present example, a partition wall 102 that separates between the grooves 101*c* and 101*d* is set to have a width (in the circumferential direction) of an upper surface thereof which increases toward the rear end side along the axial direction of the peripheral side surface of the front end portion 10T.

The projection-and-depression region 10TP having the projection-and-depression shape in the present fourth example can also provide effects similar to those of the core body 10 in the first example.

Fifth Example

Figure 8A:
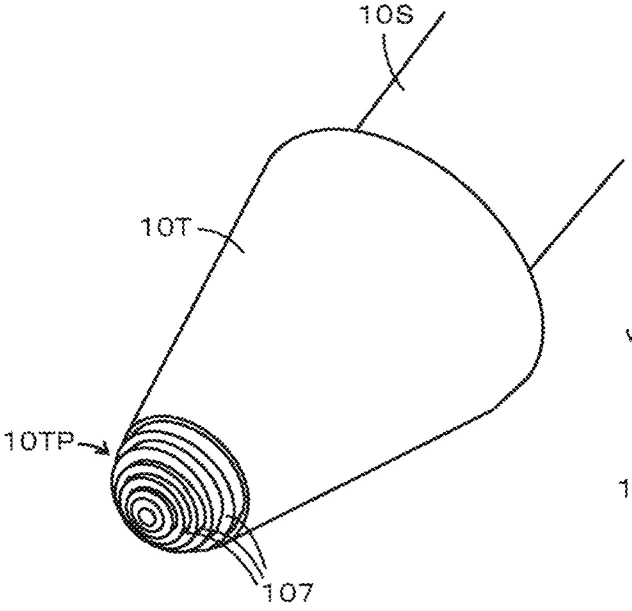
FIGS. 8A and 8B are diagrams illustrating a fifth example of a projection-and-depression shape provided to the front end portion of the electronic pen core body according to the first embodiment of the present disclosure.
Figure 8B:
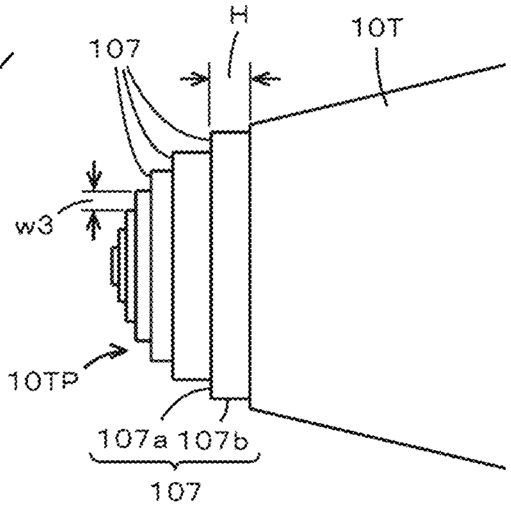

FIGS. 8A and 8B are diagrams illustrating an example of a projection-and-depression shape in a fifth example applied in the projection-and-depression region 10TP of the front end portion 10T of the core body 10. FIG. 8A is a perspective view of the front end portion 10T of the core body 10 as viewed obliquely from the foremost end side of the front end portion 10T. FIG. 8B is a side view of the front end portion 10T of the core body 10 as viewed from a direction orthogonal to the axial direction of the front end portion 10T.

In the present fifth example, the projection-and-depression region 10TP of the peripheral side surface of the front end portion 10T is provided with projections and depressions based on a plurality of step portions 107 provided in the shape of stairs in a direction along the axial direction of the surface of the projection-and-depression region 10TP. In this case, as illustrated in FIGS. 8A and 8B, each of the plurality of step portions 107 is formed in a ring shape. The diameter of the ring is gradually increased from the foremost end toward the rear end side in the axial direction of the projection-and-depression region 10TP.

As illustrated in FIG. 8B, in the present example, each of the plurality of step portions 107 is configured to have a surface 107*a* orthogonal to the axial direction of the core body 10 and a surface 107*b* parallel with the axial direction. H eight H of the surface 107*b* of each of the plurality of step portions 107, which is parallel with the axial direction, is configured to be gradually increased from the foremost end toward the rear end side in the axial direction of the projection-and-depression region 10TP. Width w3 of the surface 107*a* of each of the plurality of step portions 107, which is orthogonal to the axial direction, is configured to be all the same in the present example, but may differ between the plurality of surfaces 107*a*.

The projection-and-depression region 10TP having the projection-and-depression shape in the present fifth example can also provide effects similar to those of the core body 10 in the first example.

Sixth Example

Figure 9:
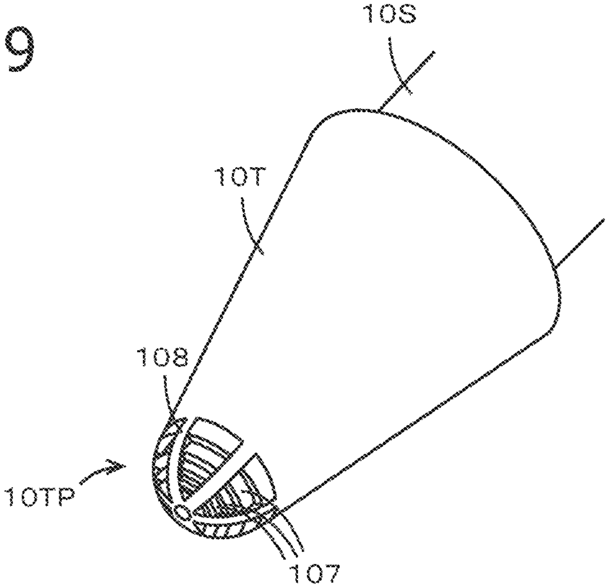
FIG. 9 is a diagram illustrating a sixth example of a projection-and-depression shape provided to the front end portion of the electronic pen core body according to the first embodiment of the present disclosure.

FIG. 9 is a diagram illustrating an example of a projection-and-depression shape in a sixth example applied in the projection-and-depression region 10TP of the front end portion 10T of the core body 10. FIG. 9 is a perspective view of the front end portion 10T of the core body 10 as viewed obliquely from the foremost end side of the front end portion 10T.

The present sixth example is a modification of the fifth example. Specifically, as described earlier, each of the plurality of step portions 107 in the fifth example is formed in a ring shape. However, in the sixth example, as illustrated in FIG. 9, the ring of each of the plurality of step portions 107 is configured to be divided into a plurality of step portions in the circumferential direction. In the present sixth example, a plurality of dividing walls 108, or six dividing walls 108 in the example of FIG. 9, which correspond to the partition walls 102 in the first example, are so provided as to divide each of the plurality of step portions 107 into a plurality of step portions, or six step portions in the present example, in the circumferential direction. An upper end surface of the width in the circumferential direction of each of the dividing walls 108 in the present example is continuous (flush) with the peripheral side surface of the front end portion 10T to form a smooth surface, as in the case of the partition walls 102 in the first example.

The projection-and-depression region 10TP having the projection-and-depression shape in the present sixth example can also provide effects similar to those of the core body 10 in the first example.

In the example of FIG. 9, all of the plurality of dividing walls 108 are configured to be connected to each other at the foremost end side of the projection-and-depression region 10TP and continuous with the peripheral side surface of the front end portion 10T. However, as illustrated in FIG. 10, some of the plurality of dividing walls 108, for example, every other dividing wall 108' in the circumferential direction among the plurality of dividing walls 108, may be configured to be discontinued (truncated) without being connected to another dividing wall 108 at the foremost end side of the projection-and-depression region 10T P.

Figure 10:
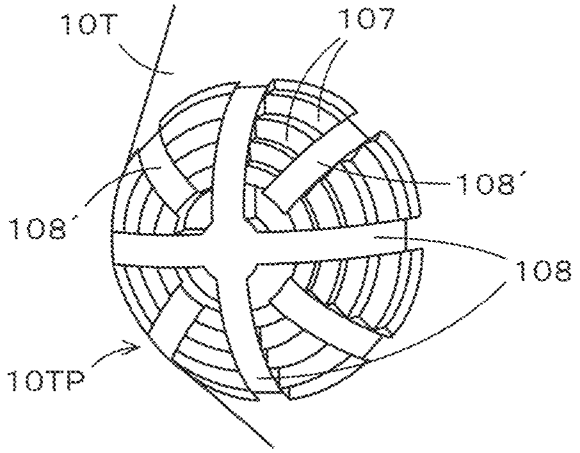
FIG. 10 is a diagram of illustrating a modification of the sixth example of the projection-and-depression shape provided to the front end portion of the electronic pen core body according to the first embodiment of the present disclosure.

In the case of the example of FIG. 10, as in the case of the example of FIG. 4 as a modification of the first example, even when a writing input is performed with the electronic pen 1 in a state in which the axial direction of the core body 10 is substantially orthogonal to the input surface, the projections and depressions formed in the projection-and-depression region 10TP of the front end portion 10T of the core body 10 produce a sense of vibration and a sense of friction.

Seventh Example

Figure 11:
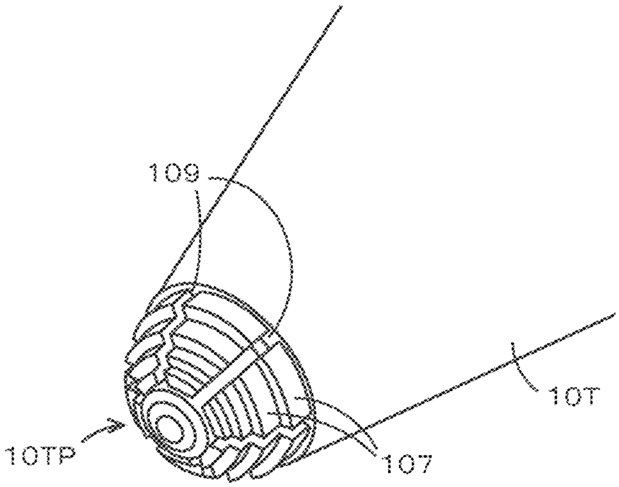
FIG. 11 is a diagram illustrating a seventh example of a projection-and-depression shape provided to the front end portion of the electronic pen core body according to the first embodiment of the present disclosure.

FIG. 11 is a diagram illustrating an example of a projection-and-depression shape in a seventh example applied in the projection-and-depression region 10TP of the front end portion 10T of the core body 10. FIG. 11 is a perspective view of the front end portion 10T of the core body 10 as viewed obliquely from the foremost end side of the front end portion 10T.

The present seventh example is also a modification of the fifth example. Also in the present seventh example, the ring of each of the plurality of ring-shaped step portions 107 is configured to be divided into a plurality of step portions in the circumferential direction. However, unlike in the sixth example in which the ring-shaped step portions 107 are divided by the dividing walls 108, the ring-shaped step portions 107 are divided (separated) by dividing grooves 109. In the example of FIG. 11, one or more ring-shaped step portions 107, such as one or two ring-shaped step portions 107, on the foremost end side of the projection-and-depression region 10TP are not divided in the circumferential direction.

The projection-and-depression region 10TP having the projection-and-depression shape in the present seventh example can also provide effects similar to those of the core body 10 in the first example.

Eighth Example

Figure 12C:
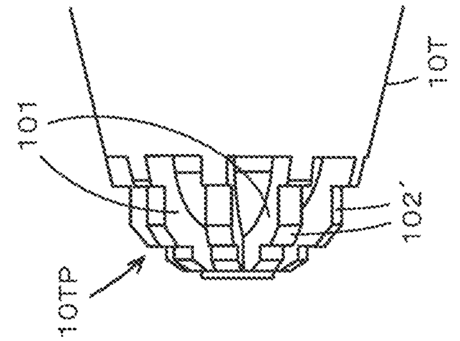
FIGS. 12A, 12B, and 12C are diagrams illustrating an eighth example of a projection-and-depression shape provided to the front end portion of the electronic pen core body according to the first embodiment of the present disclosure.
Figure 12B:
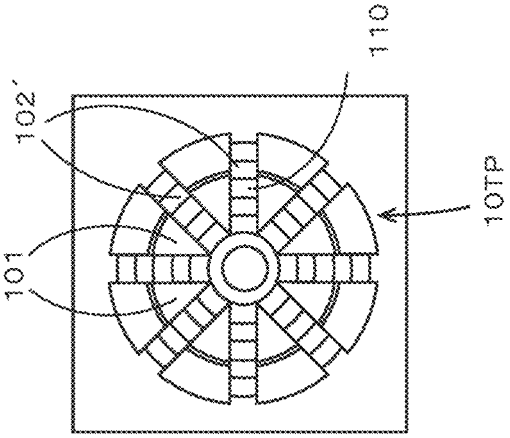
Figure 12A:
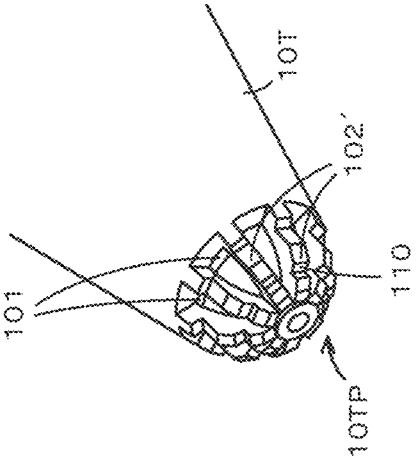

FIGS. 12A to 12C are diagrams illustrating an example of a projection-and-depression shape applied in an eighth example in the projection-and-depression region 10TP of the front end portion 10T of the core body 10. FIG. 12A is a perspective view of the front end portion 10T of the core body 10 as viewed obliquely from the foremost end side of the front end portion 10T. FIG. 12B is a view of the front end portion 10T of the core body 10 as viewed in the axial direction of the front end portion 10T from the foremost end side thereof. FIG. 12C is a side view of the front end portion 10T of the core body 10 as viewed from a direction orthogonal to the axial direction of the front end portion 10T.

The present eighth example is a modification of the first example. Specifically, in the first example, the upper surface of a partition wall 102 between grooves 101 adjacent to each other among the plurality of grooves 101 is a smooth surface continuous with the peripheral side surface of the front end portion 10T of the core body 10. In contrast, in the eighth example, as illustrated in FIGS. 12A to 12C, the upper surface of a partition wall 102' between grooves 101 adjacent to each other among the plurality of grooves 101 has projections and depressions 110 formed therein in a direction along the peripheral side surface of the front end portion 10T and along the axial direction of the front end portion 10T. In the present example, the projections and depressions 110 are formed by a plurality of step portions being provided in the direction along the peripheral side surface of the front end portion 10T and along the axial direction of the front end portion 10T.

The projection-and-depression region 10TP having the projection-and-depression shape in the present eighth example can also provide effects similar to those of the core body 10 in the first example, and produce a sense of vibration and a sense of friction when the part of a partition wall 102' of the projection-and-depression region 10TP in the front end portion 10T of the core body 10 comes into contact with the input surface.

Principal parts of the present eighth example are applicable also to the sixth example. Specifically, as in the partition wall 102' in the eighth example, the upper surface of each of the dividing walls 108 of the ring-shaped step portions 107 in the projection-and-depression region 10TP in the sixth example can also be provided with projections and depressions in the direction along the peripheral side surface of the front end portion 10T and along the axial direction of the front end portion 10T. However, in that case, the shape or the formation pitch of the projections and depressions provided to the dividing wall 108 may be made to differ from the shape or the formation pitch of the step portions 107.

Second Embodiment

Figure 13:
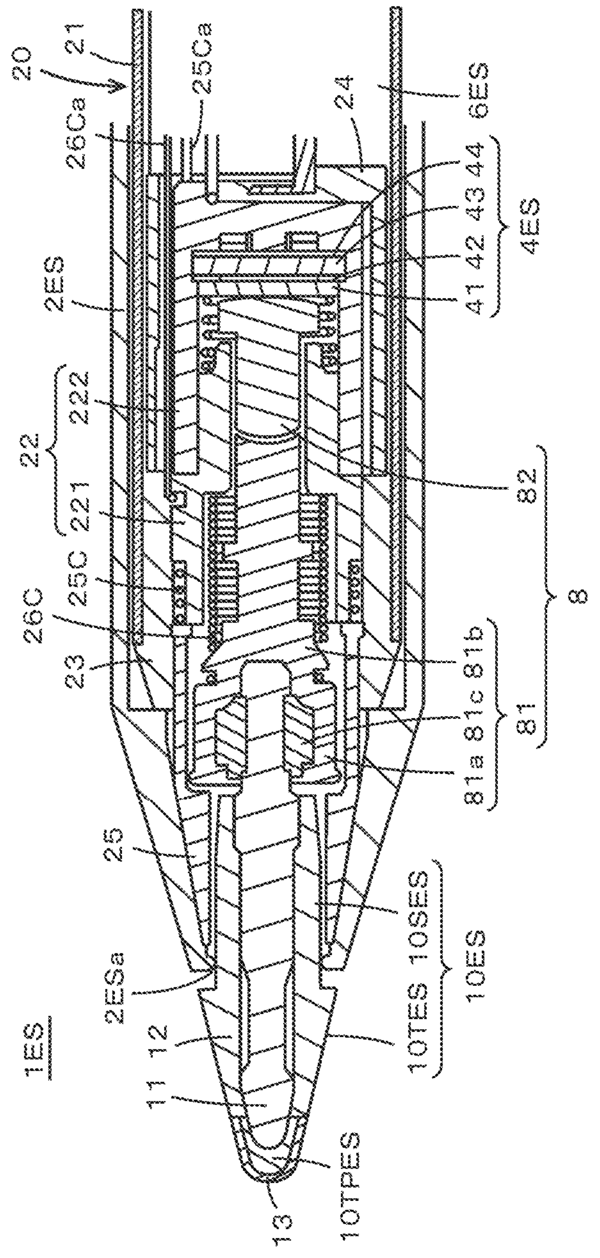
FIG. 13 is a diagram illustrating an overall configuration of an electronic pen and an electronic pen core body according to a second embodiment of the present disclosure.

A second embodiment is an example of a case where an electronic pen core body is applied to an active capacitive type electronic pen. FIG. 13 is a sectional view illustrating an example of a configuration on the pen tip side of an electronic pen 1ES according to the second embodiment. As illustrated in FIG. 13, the electronic pen 1ES according to the second embodiment has a casing 2ES in a tubular shape, or a circular cylindrical shape in the present example. One end side in the axial direction of the casing 2ES is a pen tip side having a tapered shape portion 2Est that is gradually tapered, and an opening portion 2ESa is provided to a front end side of the tapered shape portion 2Est on the pen tip side.

An internal hollow portion of the casing 2ES is configured to communicate with the opening portion 2ESa, and houses an electronic pen main body portion unit 20 of an active capacitive type in the present example. The electronic pen main body portion unit 20 has a pen pressure transmitting member 8, a pen pressure detecting portion 4ES, and a circuit board 6ES housed in this order from the pen tip side in the axial direction of the internal unit casing 21 within an internal unit casing 21 formed of conductive metal.

The pen pressure transmitting member 8 and the pen pressure detecting portion 4ES are housed within a pen pressure detecting portion holder 22 of a cylindrical shape in the present example. The pen pressure detecting portion holder 22 is formed by a pipe-shaped member 221 and a pen pressure detecting portion holding member 222 of a cup shape, which are coupled to each other in the axial direction. The pen pressure detecting portion 4ES is held in the pen pressure detecting portion holding member 222, and the pen pressure transmitting member 8 is housed in a state of being movable in the axial direction within the pipe-shaped member 221.

A pen tip side cap member 23 is provided on the pen tip side of the internal unit casing 21. The pipe-shaped member 221 of the pen pressure detecting portion holder 22 is held within a hollow portion of the pen tip side cap member 23. The pen pressure detecting portion holding member 222 is housed within a pen tip side tubular member 24 of a board holder that holds the circuit board 6ES. Though not illustrated in FIG. 13, the circuit board 6ES is provided with a signal transmitting circuit for transmitting a signal to be sent out from a conductive core body 10ES, a receiving circuit for receiving a signal at a peripheral electrode 25 through a position detecting sensor, and the like.

In the present example, the peripheral electrode 25 is attached to the pen tip side of the pen tip side cap member 23. The peripheral electrode 25 is formed in a tubular shape of a material having conductivity, for example, conductive metal, and is so disposed as to surround a core body main body portion 10SES of the core body 10ES including a central electrode having conductivity, as will be described later. The peripheral electrode 25 in the present example plays a role of an electrode that receives a signal from the position detecting sensor side.

As illustrated in FIG. 13, a side surface on the pen tip side of the pipe-shaped member 221 is provided with a coil spring 25C for the peripheral electrode. The coil spring 25C is formed of a conductive material such as conductive metal in the present example. One end portion of the coil spring 25C is connected to the peripheral electrode 25. Another end portion of the coil spring 25C is extended to the circuit board 6ES, and is connected to a predetermined conductor pattern of the circuit board 6ES.

As illustrated in FIG. 13, the core body 10ES includes a front end portion 10TES projecting outward of the opening portion 2ESa of the casing 2ES and the core body main body portion 10SES coupled to the front end portion 10TES in the axial direction of the core body 10ES.

The core body 10ES is for the electronic pen 1ES of the active capacitive type, and is thus configured to have conductivity. In the present example, as illustrated in FIG. 13, the core body 10ES includes a central electrode 11 formed of a conductive material, wherein a large part of the central electrode 11 excluding its rear end side is covered by a protective member 12 formed of a nonconductive material such as resin in the present example. On the rear end side of the core body 10ES, the central electrode 11 is exposed without being covered by the protective member 12.

As illustrated in FIG. 13, the core body 10ES is attached to the electronic pen 1ES by fitting a part of the core body 10ES, which is on the rear end side where the central electrode 11 is exposed, to the pen pressure transmitting member 8.

The pen pressure transmitting member 8 is constituted by a core body holding member 81 located on the pen tip side, and a pressing member 82. The core body holding member 81 and the pressing member 82 are formed of a nonconductive material. The core body holding member 81 includes a cup-shaped holding portion 81*a* having a recessed portion, and an extending portion 81*b* extended from a rear end of the holding portion 81*a* to the rear end side in an opposite direction from the pen tip. The recessed portion of the holding portion 81*a* is provided with a ring-shaped elastic member 81*c* having conductivity such as conductive rubber, for example.

As illustrated in FIG. 13, the part on the rear end side of the core body 10E S where the central electrode 11 is exposed is inserted into the recessed portion of the holding portion 81*a* of the core body holding member 81. The elastic member 81*c* within the recessed portion of the holding portion 81*a* fastens the periphery of the part where the central electrode 11 is exposed, so that the core body 10ES is held by the core body holding member 81. The core body 10ES can be pulled out and removed from the core body holding member 81.

As illustrated in FIG. 13, the periphery of the extending portion 81*b* of the core body holding member 81 of the pen pressure transmitting member 8 is provided with a core body coil spring 26C formed of a conductive material, or conductive metal in the present example. One end portion on the pen tip side of the core body coil spring 26C is connected to the conductive elastic member 81*c*. Another end portion 26Ca on the rear end side of the core body coil spring 26C is extended onto the circuit board 6ES, and is connected to the signal transmitting circuit on the circuit board 6ES. Thus, a signal from the signal transmitting circuit on the circuit board 6ES is supplied to the central electrode 11 of the core body 10ES through the core body coil spring 26C and the elastic member 81*c*, and is transmitted from the central electrode 11 to the position detecting sensor.

As illustrated in FIG. 13, the extending portion 81*b* of the core body holding member 81 of the pen pressure transmitting member 8 is coupled to the pressing member 82 in the axial direction, and is configured such that a pressing head portion of the pressing member 82 presses the pen pressure detecting portion 4ES according to a pen pressure applied to the core body 10ES.

In the present example, as illustrated in FIG. 13, the pen pressure detecting portion 4ES has a configuration of a well-known variable capacitance capacitor formed by a first electrode 41 as a circular flat plate opposing one surface of a dielectric 43 as a circular flat plate with a ring-shaped spacer 42 interposed therebetween, and a circular second electrode 44 made of metal and affixed to another surface of the dielectric 43. The pen pressure applied to the core body 10ES is detected according to the capacitance of the variable capacitance capacitor.

In the second embodiment, in the front end portion 10TES of the core body 10ES, a projection-and-depression region 10TPES having a configuration similar to that of the core body 10 for the electromagnetic coupling type electronic pen according to the first embodiment described above is provided on the foremost end side of the part of the protective member 12 formed of resin. The configuration of any of the first to eighth examples described as the projection-and-depression shape of the projection-and-depression region 10TP of the core body 10 according to the first embodiment described above may be adopted as the shape of projections and depressions provided to the projection-and-depression region 10TPES.

In the second embodiment, the projection-and-depression region 10TPES is configured to be covered by a coating layer 13 formed of a material, such as elastomer, which is softer than the resin material of a front end portion of the front end portion 10TES of the core body 10ES. U rethane resin having high wear resistance is used as the elastomer in the present example. In this case, in the present embodiment, the urethane resin used for the coating layer 13 is mixed with a granular object having high hardness, such as glass beads, such that the coating layer 13 produces a heightened sense of friction. The thickness of the coating layer 13 is set to be 25 to 50 μm. It is to be noted that the granular object mixed in the urethane resin is not limited to glass beads, and may be urethane beads, for example.

While crystalline resin can be used as the resin forming the protective member 12 of the core body 10ES in the second embodiment, non-crystalline resin such as polycarbonate in the present example is used as the resin in the present embodiment. An advantage of using non-crystalline resin is that, when different resin is attached to the non-crystalline resin, the different resin is bonded to the non-crystalline resin and does not peel off. That is, in the present second embodiment, since the protective member 12 is formed of polycarbonate as non-crystalline resin, the coating layer 13 of urethane resin does not peel off even in a case where the entire projection-and-depression region 10TP of the protective member 12 is covered by the coating layer 13.

Examples of non-crystalline resin include, in addition to polycarbonate (PC) in the present example, polyvinyl chloride (PVC), polystyrene (PS), polymethyl methacrylate (PMMA), acrylonitrile-butadiene-styrene (ABS), modified polyphenylene ether (m-PPE), polyether sulfone (PES/PESU), polyetherimide (PEI), polyamidimide (PAI), or the like. In the second embodiment, resin harder than an elastomer, such as urethane, is used as the non-crystalline resin.

Examples of crystalline resin include, in addition to POM used as the material of the core body 10 in the first embodiment described above, polyethylene (PE), polypropylene (PP), polyamide (PA), polyethylene terephthalate (PET), polyphenylene sulfide (PPS), polybutylene terephthalate (PBT), polyetheretherketone (PE E K), a liquid crystal polymer (LC P), polytetrafluoroethylene (PTFE: a product name of Teflon (registered trademark)), or the like.

Figure 14B:
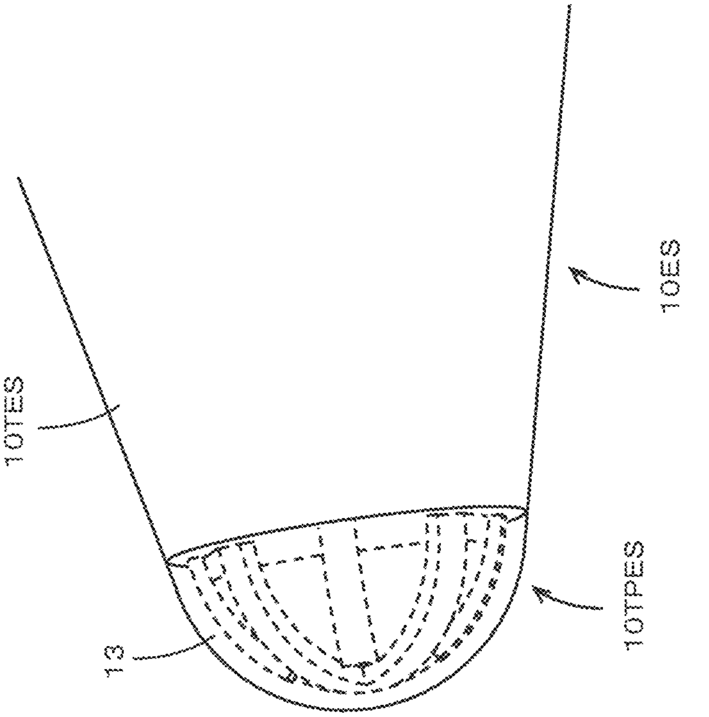
FIGS. 14A and 14B are diagrams illustrating an example configuration of a front end portion of the electronic pen core body according to the second embodiment of the present disclosure.
Figure 14A:
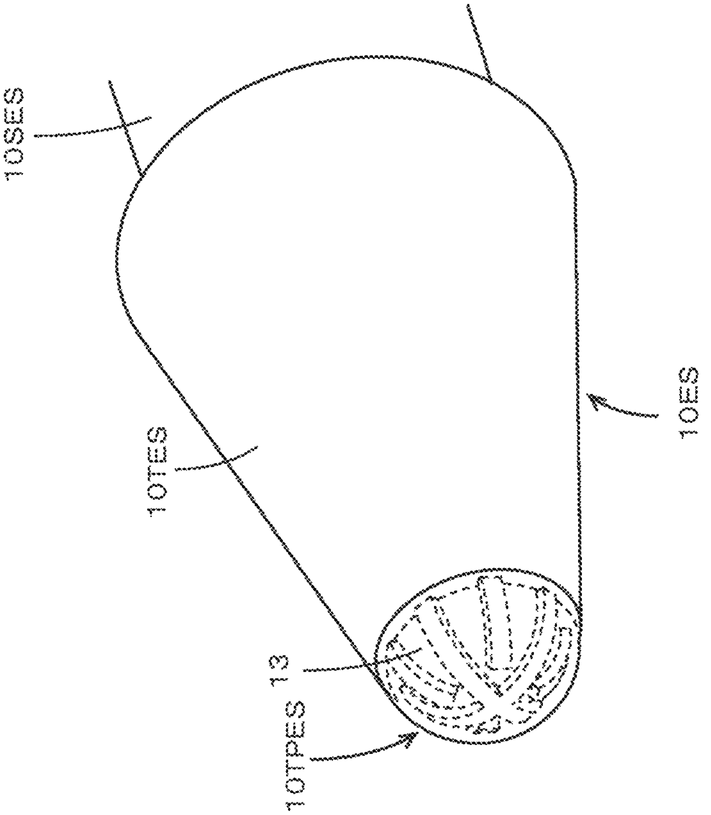

FIGS. 14A and 14B illustrate an example configuration of the front end portion 10TES of the core body 10ES in the case of the second embodiment. In the present example, the projection-and-depression shape of the projection-and-depression region 10TPES in the front end portion 10TES of the core body 10ES is the projection-and-depression shape illustrated in FIG. 4 illustrated as a modification of the first example. In FIG. 14, the projection-and-depression shape of the projection-and-depression region 10TPES is covered by the coating layer 13, and is hence illustrated in dotted lines.

According to the core body 10ES in the second embodiment of the above configuration, the projection-and-depression region 10TPES is provided to the front end side as a contact part of the front end portion 10TES which comes into contact with the input surface. Thus, as in the case of the core body 10 according to the first embodiment, even in a case where the front end side of the front end portion 10TES is made into a thin shape, it is possible to produce a sense of vibration and a sense of friction between the projection-and-depression region 10TPES and the input surface while also maintaining wear resistance. Moreover, according to the core body 10ES in the second embodiment, the projection-and-depression region 10TPES of the front end portion 10TES is coated with an elastomer softer than the resin of the front end portion 10TES, such as urethane resin in the present example. Thus, the characteristic of the coating layer 13 adds to the sense of vibration and the sense of friction produced by the projection-and-depression region 10TPES to produce a unique sense of vibration and friction.

In the present second embodiment, because a hard granular object such as glass beads or urethane beads is mixed in the urethane resin constituting the coating layer 13, it is possible to provide a new sense of ease in using the electronic pen including a unique sense of vibration and friction between the projection-and-depression region 10TPES of the front end portion 10TES of the core body 10ES and the input surface.

Incidentally, an electronic pen core body fabricated by processing polycarbonate (PC) as non-crystalline resin has high hardness as in POM, but has low friction resistance and has a disadvantage of being easily worn out by contact with the input surface.

On the other hand, the core body 10ES in the second embodiment is configured such that polycarbonate, which is non-crystalline resin, is used as the material of the front end portion 10TES of the core body 10ES and, additionally, the front end portion 10TES is covered by the coating layer 13 formed of urethane resin having excellent wear resistance. The configuration ensures wear resistance of the front end portion 10TES of the core body 10ES, and the coating layer 13 is capable of producing a sense of vibration and a sense of friction. These effects can be obtained irrespective of whether or not the projection-and-depression region 10TPES is provided to the front end of the front end portion 10TES of the core body 10ES.

In addition, a sense of vibration and a sense of friction obtained by mixing a hard granular object such as glass beads or urethane beads in the urethane resin constituting the coating layer 13 is also obtainable irrespective of whether or not the projection-and-depression region 10TPES is provided to the front end of the front end portion 10TES of the core body 10E S.

Y et, in the second embodiment described above, since the projection-and-depression region 10TPES is provided to the front end of the front end portion 10TES of the core body 10ES, a sense of vibration and a sense of friction obtained from the projection-and-depression region 10TPES and a sense of vibration and a sense of friction obtained by mixing a hard granular object such as glass beads or urethane beads in the coating layer 13 are added together to produce a unique sense of ease in using the electronic pen.

Further, there are many types of non-crystalline resin excellent in transparency and transmissibility such as polycarbonate (PC) used for the protective member 12 in the present example and polymethyl methacrylate (PMMA). Hence, in the second embodiment, the front end portion 10TES of the core body 10ES can be made transparent in addition to being formed into a thin shape on the front end side of the front end portion 10TES, so as to further improve the visibility of the pen tip at a time of writing to the input surface using the electronic pen 1.

As described above, the second embodiment provides a core body that makes it possible to generate an adequate amount friction and improve a sense of ease by using non-crystalline resin, such as polycarbonate (PC) in the present example, to form the front end portion of the electronic pen core body, and to prevent wear of polycarbonate (PC) by applying the urethane coating on the front end of the front end portion.

It is thus possible to produce a pen tip that, as compared with the conventional pen tip, can be formed in a thin (fine) shape, is made of hard material and is not easily deformable, and is transparent.

Hence, it is possible to realize a pen tip that is excellent in producing a sense of vibration and a sense of friction, is excellent in wear resistance, and is highly visible.

In the present example, the entire projection-and-depression region 10TPES is configured to be covered by the coating layer 13 formed of urethane resin. However, it may suffice to fill only the recessed portions of the projection-and-depression shape described in the above-described first embodiment with urethane resin. Specifically, it is possible to fill only the grooves 101 in the first example, the grooves 101*a* and 101*b* in the second example, the grooves 105 in the third example, the grooves 101*c* and 101*d* in the fourth example, or the dividing grooves 109 in the seventh example with the coating material. In addition, a configuration is possible in which the step portions 107 in regions excluding the dividing walls 108 in the sixth example are covered with the coating material. In addition, not only the projection-and-depression region 10TPES but also the entire peripheral side surface of the front end portion 10TES of the core body 10ES may be covered by the coating layer 13.

The configuration in which the front end portion of the core body is covered by a coating layer as in the second embodiment can be applied also to the front end portion 10T of the core body 10 according to the first embodiment. In this case also, the resin member constituting the core body 10 is preferably non-crystalline resin, but even in a case where the front end portion 10T of the core body 10 is formed of crystalline resin, the coating layer can be more firmly bonded to the part in which the projection-and-depression region 10TP is present than a smooth surface part which does not include any projections or depressions.

In a case where the front end portion 10T of the core body 10 according to the first embodiment described above is provided with the coating layer, at least the projection-and-depression region 10TP is covered, as in the second embodiment. Further, also in the case where the front end portion 10T of the core body 10 according to the first embodiment is thus provided with the coating layer, the entire projection-and-depression region 10TP may be covered by the coating layer, or only the recessed portions of the projection-and-depression shape may be filled with the coating material. In addition, the entire peripheral side surface of the front end portion 10T of the core body 10 may be covered by the coating layer.

Also in the case of the core body 10 according to the first embodiment, a sense of vibration and a sense of friction obtained by mixing a hard granular object such as glass beads or urethane beads in the urethane resin constituting the coating layer is obtainable, irrespective of whether or not the projection-and-depression region 10TP is provided to the front end of the front end portion 10T of the core body 10.

However, since the projection-and-depression region 10TP is provided to the front end of the front end portion 10T of the core body 10 in the first embodiment, a sense of vibration and a sense of friction obtained from the projection-and-depression region 10TP and a sense of vibration and a sense of friction obtained by mixing a hard granular object such as glass beads or urethane beads in the coating layer are added together to provide a unique sense of ease in using the electronic pen.

Other Embodiments and Modifications

The core body 10 according to the first embodiment described above is configured supposing that the front end portion 10T and the core body main body portion 10S are formed integrally with each other. However, the front end portion 10T and the core body main body portion 10S may be formed as separate members.

In addition, the core body for the active capacitive type electronic pen according to the second embodiment described above is not limited to the configuration in which the conductive central electrode is covered at the front end portion by the protective member 12 formed of resin as a non-conductive material. For example, the front end portion and the core body main body portion may be formed of conductive resin to which conductive metallic powder is mixed in.

Further, such conductive resin may be exposed at the front end portion, and the projection-and-depression region may be provided to the exposed part of the conductive resin.

It is to be noted that the embodiments of the present disclosure are not limited to the foregoing, and various changes can be made without departing from the scope of the present disclosure.

The invention claimed is:

1. An electronic pen core body, comprising:

a front end portion configured to project outward from an opening on one end side in an axial direction of a tubular casing of an electronic pen, and a plurality of projections and depressions provided along a circumferential direction of the electronic pen core body and/or along an axial direction of the electronic pen core body, in at least a part of the front end portion, wherein the part of the front end portion is configured to come into contact with an input surface when the electronic pen performs an indication input on the input surface, and wherein the plurality of projections and depressions are configured to directly contact the input surface at a plurality of points when the electronic pen is perpendicular to the input surface and when the electronic pen is tilted relative to the input surface.

2. The electronic pen core body according to claim 1, wherein the plurality of projections and depressions are formed by a plurality of grooves provided in at least the part of the front end portion.

3. The electronic pen core body according to claim 2, wherein the plurality of grooves are provided in a plural number along the circumferential direction of the electronic pen core body and/or along the axial direction of the electronic pen core body.

4. The electronic pen core body according to claim 3, wherein a partition wall is provided between the plurality of grooves provided along the circumferential direction of the electronic pen core body, and a surface of the partition wall, which is continuous with a peripheral side surface of the front end portion of the electronic pen core body, is provided with the projections and depressions along the axial direction of the electronic pen core body.

5. The electronic pen core body according to claim 3, wherein the plurality of grooves are provided at equal intervals along the circumferential direction of the electronic pen core body.

6. The electronic pen core body according to claim 2, wherein a circumferential width of each of the plurality of grooves gradually increases from a front end to a rear end of the front end portion along the axial direction of the electronic pen core body.

7. The electronic pen core body according to claim 2, wherein a circumferential width of each of the plurality of grooves is unchanged from a front end to a rear end of the front end portion along the axial direction of the electronic pen core body.

8. The electronic pen core body according to claim 2, wherein the plurality of grooves are provided along the circumferential direction, and partition walls are provided between two adjacent grooves of the plurality of grooves, and at least one partition wall is discontinued so as not to join the rest of the partition walls on a foremost end side of the front end portion of the electronic pen core body such that the two adjacent grooves on either side of the at least one partition wall form a single continuous groove.

9. The electronic pen core body according to claim 1, wherein the plurality of projections and depressions are provided by a plurality of step portions defined along the axial direction of the electronic pen core body in at least the part of the front end portion.

10. The electronic pen core body according to claim 9, wherein the plurality of step portions defined along the axial direction of the electronic pen core body are divided into a plurality of step sub-portions in the circumferential direction of the electronic pen core body.

11. The electronic pen core body according to claim 9, wherein the plurality of step portions defined along the axial direction of the electronic pen core body are divided into a plurality of step sub-portions by a plurality of dividing grooves provided in the circumferential direction of the electronic pen core body.

12. The electronic pen core body according to claim 9, wherein the plurality of step portions defined along the axial direction of the electronic pen core body are divided into a plurality of step sub-portions by a plurality of dividing walls provided in the circumferential direction of the electronic pen core body.

13. The electronic pen core body according to claim 12, wherein at least one dividing wall of the plurality of dividing walls is discontinued so as not to join the rest of the dividing walls on a foremost end side of the front end portion of the electronic pen core body.

14. The electronic pen core body according to claim 1, wherein at least recessed portions of the plurality of projections and depressions are covered by a member of a material softer than a material of the front end portion.

15. The electronic pen core body according to claim 14, wherein the front end portion of the electronic pen core body is formed of non-crystalline resin.

16. The electronic pen core body according to claim 14, wherein particles harder than an elastomer are mixed in the member of the material softer than the material of the front end portion.

17. The electronic pen core body according to claim 1, comprising:

a core body main body portion coupled to the front end portion in the axial direction of the electronic pen core body, wherein the electronic pen core body main body portion is in a rod shape having a uniform diameter, and a maximum diameter of the front end portion is larger than the uniform diameter of the electronic pen core body main body portion.

18. The electronic pen core body according to claim 1, comprising:

a core body main body portion coupled to the front end portion in the axial direction of the electronic pen core body, wherein the front end portion and the electronic pen core body main body portion are formed integrally with each other of a same material.

19. The electronic pen core body according to claim 1, comprising:

a core body main body portion coupled to the front end portion in the axial direction of the electronic pen core body, wherein the front end portion and the electronic pen core body main body portion are formed of different materials.

20. The electronic pen core body according to claim 1, comprising:

a core body main body portion coupled to the front end portion in the axial direction of the electronic pen core body, wherein the electronic pen core body main body portion includes a core rod formed of conductive metal or conductive non-metal material.

21. The electronic pen core body according to claim 1, wherein the front end portion includes a tapered shape portion that is tapered toward a front end.

22. An electronic pen comprising:

a casing having an opening on a pen tip side as one end side in an axial direction, and having an internal hollow portion communicating with the opening;

a pen pressure detecting portion disposed in the internal hollow portion of the casing; and a core body having, on one end side in the axial direction, a front end portion capable of projecting outward from the opening on the pen tip side of the casing, and another end side in the axial direction to be fitted to the pen pressure detecting portion, wherein a plurality of projections and depressions are provided along a circumferential direction of the core body and/or along the axial direction of the core body, in at least a part of the front end portion of the core body, wherein the part of the front end portion is configured to come into contact with an input surface when the electronic pen performs an indication input on the input surface, and wherein the plurality of projections and depressions are configured to directly contact the input surface at a plurality of points when the electronic pen is perpendicular to the input surface and when the electronic pen is tilted relative to the input surface.

* * * * *